US012729099B2

(12) United States Patent
Keller

(10) Patent No.: US 12,729,099 B2
(45) Date of Patent: Sep. 8, 2026

(54) INDUSTRIAL TRUCK WITH A LOAD RECEIVING ELEMENT FOR RECEIVING ELONGATED GOODS

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 697 days.

(21) Appl. No.: 17/918,566

(22) PCT Filed: Mar. 17, 2021

(86) PCT No.: PCT/EP2021/056842
§ 371 (c)(1),
(2) Date: Oct. 13, 2022

(87) PCT Pub. No.: WO2021/209219
PCT Pub. Date: Oct. 21, 2021

(65) Prior Publication Data

US 2023/0135834 A1 May 4, 2023

(30) Foreign Application Priority Data

Apr. 14, 2020 (DE) ..................... 10 2020 110 180.5

(51) Int. Cl.
*B66F 9/18* (2006.01)
*B66F 9/07* (2006.01)
*B66F 9/075* (2006.01)

(52) U.S. Cl.
CPC .............. *B66F 9/18* (2013.01); *B66F 9/0755* (2013.01)

(58) Field of Classification Search
CPC ................................. B66F 9/18; B66F 9/0755
See application file for complete search history.

(56) References Cited

U.S. PATENT DOCUMENTS 6,022,182 A 2/2000 Everett
10,754,466 B2 * 8/2020 Ochenas ................. G06F 3/048
11,294,393 B2 * 4/2022 Thode .................. G05D 1/0274
12,157,658 B2 * 12/2024 Takao .................... G05D 1/661
2012/0191272 A1 7/2012 Andersen et al.
2016/0090285 A1 * 3/2016 Svensson ............. G05D 1/0246 700/300
2019/0161943 A1 5/2019 Frank
(Continued)

FOREIGN PATENT DOCUMENTS

DE 698 00 852 T2 3/2002
DE 10 2004 047 209 A1 3/2006
(Continued)

*Primary Examiner* — Saul Rodriguez
*Assistant Examiner* — Ashley K Romano
(74) *Attorney, Agent, or Firm* — Norman B. Thot

(57) ABSTRACT

An industrial truck includes a load-receiving element which receives elongated-goods, an elongated-goods detection device which detects the elongated-goods, and a safety controller having at least one monitoring sensor. The safety controller forms at least one protection field together with the at least one monitoring sensor. The safety controller is operatively connected to the elongated-goods detection device and influences the at least one protection field as a function of the elongated-goods detected by the elongated-goods detection device.

11 Claims, 10 Drawing Sheets

(56) References Cited

U.S. PATENT DOCUMENTS

| | | | |
|---|---|---|---|
| 2019/0271990 A1 | 9/2019 | Grabbe et al. | |
| 2019/0287405 A1 | 9/2019 | Lewandowski et al. | |
| 2020/0255235 A1* | 8/2020 | Ruhland | B66F 9/0755 |
| 2022/0108613 A1* | 4/2022 | Estep | H04B 1/7163 |
| 2022/0363528 A1* | 11/2022 | Okamoto | B66F 9/0759 |
| 2022/0390955 A1* | 12/2022 | McLachlan | B66F 9/07568 |
| 2024/0336463 A1* | 10/2024 | Finley | B66F 9/07581 |

FOREIGN PATENT DOCUMENTS

| | | | |
|---|---|---|---|
| DE | 10 2018 109 298 | A1 | 7/2019 |
| EP | 3 543 204 | A2 | 9/2019 |
| JP | S6327398 | A | 2/1988 |
| JP | 2015-84139 | A | 4/2015 |

* cited by examiner

INDUSTRIAL TRUCK WITH A LOAD RECEIVING ELEMENT FOR RECEIVING ELONGATED GOODS

CROSS REFERENCE TO PRIOR APPLICATIONS

This application is a U.S. National Phase application under 35 U.S.C. § 371 of International Application No. PCT/EP2021/056842, filed on Mar. 17, 2021 and which claims benefit to German Patent Application No. 10 2020 110 180.5, filed on Apr. 14, 2020. The International Application was published in German on Oct. 21, 2021 as WO 2021/209219 A1 under PCT Article 21(2).

FIELD

The present invention relates to an industrial truck with a load-receiving element for receiving elongated goods.

DE 698 00 852 T2 describes an industrial truck with a load-receiving element for receiving elongated goods.

DE 10 2018 109 298 A1 describes an industrial truck with a safety controller.

A disadvantage of this prior art is that the industrial truck with a load-receiving element for receiving elongated goods has no safety controller that meets the special requirements desired of an industrial truck with load-receiving element for receiving elongated goods.

SUMMARY

An aspect of the present invention is to provide an industrial truck without this disadvantage.

In an embodiment, the present invention provides an industrial truck which includes a load-receiving element which is configured to receive elongated-goods, an elongated-goods detection device which is configured to detect the elongated-goods, and a safety controller comprising at least one monitoring sensor. The safety controller forms at least one protection field together with the at least one monitoring sensor. The safety controller is operatively connected to the elongated-goods detection device and is configured to influence the at least one protection field as a function of the elongated-goods detected by the elongated-goods detection device.

BRIEF DESCRIPTION OF THE DRAWINGS

The present invention is described in greater detail below on the basis of embodiments and of the drawings in which.

DETAILED DESCRIPTION

Figure 1:
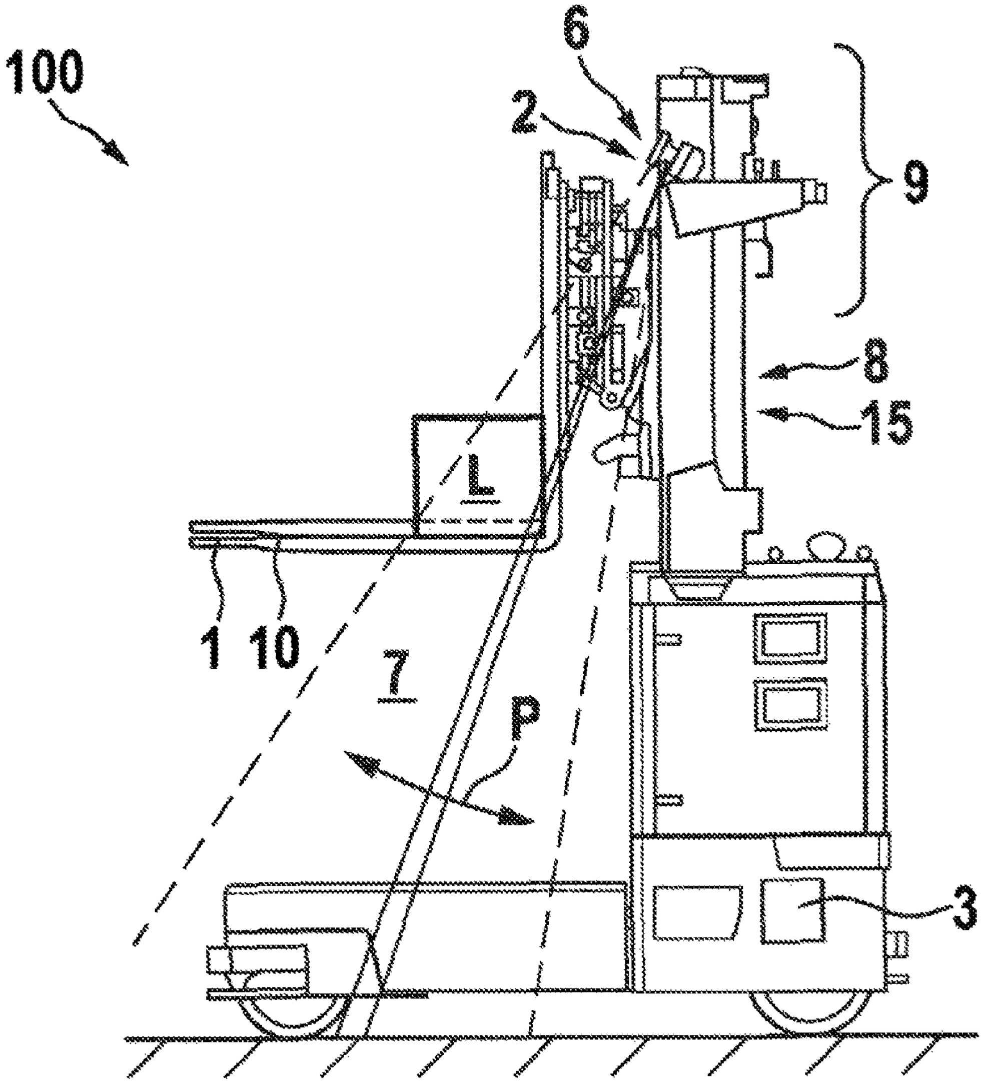
FIG. 1 shows a side view of a first exemplary embodiment of an industrial truck according to the present invention with received elongated goods.

The industrial truck according to the present invention has an elongated-goods detection device for detecting elongated goods. The industrial truck according to the present invention also has a safety controller which has at least one monitoring sensor and via which the at least one monitoring sensor forms at least one protection field. The safety controller is operatively connected to the elongated-goods detection device and is configured to influence the at least one protection field as a function of the elongated goods detected by the elongated-goods detection device.

The protection field may also be referred to as a monitoring field. It can, for example, move along with the industrial truck. The protection field can, for example, be a part of the detection region of the monitoring sensor.

The safety controller can, for example, be configured so that, if approaching vehicles or persons are detected, for example, via the at least one monitoring sensor, the industrial truck will be transferred into a safe state as soon as the required minimum distances are undershot and/or as soon as approaching vehicles or persons enter the at least one protection field. The transfer into the safe state can mean a reduction in travel speed or a stopping of the industrial truck. It can also mean that a movement of the load-receiving element relative to the industrial truck is slowed down or stopped. Approaching vehicles or persons may also be those which themselves are standing still and which the industrial truck is approaching.

The safety controller can be configured so that if non-moving objects, such as walls or shelves or parked goods, are detected, the industrial truck will be transferred into the safe state as soon as the required minimum distances are undershot and/or an object enters a protection field.

An industrial truck with a load-receiving element for receiving elongated goods can thereby be provided with a safety controller that meets desired special requirements for an industrial truck with a load-receiving element for receiving elongated goods. This is because the protection field only needs to be formed as large as actually necessary, depending on the received elongated goods. A particularly smooth operation can thereby be provided with a simultaneous high level of protection.

The monitoring sensor may include a personal protection scanner.

The load-receiving element may, for example, comprise a lifting fork or a loading platform.

The industrial truck may be designed as a stacker truck. The industrial truck may thus comprise a lift mast, and the load-receiving element of the industrial truck may comprise a lifting fork. The lifting fork can, for example, have prongs, for example, two prongs. The prongs can, for example be spaced apart from one another so that the prongs are arranged outside the wheel arms, as viewed from above, or a distance-adjusting device for the prongs is provided which permits this arrangement. Due to the large distance of the prongs from one another thereby achieved or achievable, a special suitability for receiving elongated goods may result.

The industrial truck can, for example, have a chassis. The chassis may be of a U-shaped design. The two legs of the U shape may in each case be formed by a wheel arm.

The industrial truck may be designed as a reach truck. The lift mast of the industrial truck can thus be extendable and again retractable. The reach mast can be arranged between the wheel arms and extension and retraction can take place parallel to the wheel arms.

The industrial truck can, for example, be a vehicle which is designed as a side loader. The industrial truck can, for example, permit travel transverse to the fork prongs. The industrial truck can, for example, permit travel transverse to a load-receiving movement of the industrial truck and/or of the lifting fork. The industrial truck can, for example, permit travel in the longitudinal direction of the load.

The industrial truck can, for example, be moved in transverse travel and in longitudinal travel. The industrial truck can, for example, be a multidirectional vehicle which, in addition to transverse travel and longitudinal travel, can, for example, be moved in circular travel, which is also called carousel travel. All of the wheels of the industrial truck can, for example, be steered by at least 90°. Transverse travel can, for example, differ from longitudinal travel in that, in each case when traveling straight ahead and viewed relative to the chassis, the wheels are rotated by 90°.

The elongated goods may be a load that is longer than an ordinary pallet. The elongated goods may be a load that is longer than 1200 mm. The elongated goods may be a load that projects beyond the outline of the industrial truck in the state received on the load-receiving element and in the ready-to-drive state of the industrial truck (thus, in the case of a reach truck, for example, when the reach mast is retracted) so that an overall outline of industrial truck and load results that is larger than the outline of industrial truck without a load.

In the context of this document, the term "elongated-goods detection device" refers to a device for detecting elongated goods. The device can, for example, detect whether elongated-goods are arranged on the load-receiving element of the industrial truck. The elongated-goods detection device can, for example, be an automatic elongated-goods detection device. The elongated-goods detection device can thus, for example, be configured to act automatically. The elongated-goods detection device can, for example, detect whether and/or to what extent and/or at which location a load arranged on the load-carrying element projects beyond the outline of the industrial truck.

The industrial truck can, for example, be a driverless transport vehicle. It can thus, for example, have a device for its automatic control and/or contactless guidance.

The safety controller can, for example, be configured to adapt the at least one protection field or one of the protection fields to the overall outline resulting from the industrial truck and the received load.

The at least one protection field or one of the protected fields can be formed in front of the industrial truck in the direction of travel. The width of the at least one protection field or of one of the protection fields, i.e., its extension perpendicular to the direction of travel, can correspond at least approximately to the width, i.e., the extension perpendicular to the direction of travel, of the vehicle outline or of the overall outline.

The safety controller can, for example, be configured to switch between protection fields as a function of elongated goods detected by the elongated-goods detection device, the protection fields differing in size and/or shape and/or position relative to the industrial truck.

In another embodiment, the safety controller influences the size and/or shape and/or position relative to the industrial truck of the at least one protection field or of one of the protection fields as a function of elongated goods detected by the elongated-goods detection device. This can result in a continuous adjustment of the protection field.

The safety controller can, for example, be configured so that, in the case of an overall outline enlarged at the front in the direction of travel, it forms a larger protection field in the front in the direction of travel than in the case of an outline or overall outline that is not enlarged in the front in the direction of travel.

The safety controller can, for example, be configured so that, in the case of an overall outline that is enlarged transversely to the direction of travel, it forms a protection field that is larger transversely to the direction of travel than in the case of an outline or overall outline that is not enlarged transversely to the direction of travel.

The industrial truck can, for example, have a lift mast with an upper region. The elongated-goods detection device can, for example, comprise a laser scanner with a scanner detection region. The scanner detection region can, for example, be directed at the load-receiving means. The laser scanner can, for example, be arranged on the upper region of the lift mast and its scanner detection region can, for example, be directed obliquely downward onto the lifting fork. The scanner detection region of the laser scanner can be two-dimensional, for example, formed by exactly one integrated rotating mirror. The first dimension can be formed in the direction of the laser beam and the second dimension can be formed perpendicularly thereto, for example, by the deflection of the rotating mirror. The laser scanner can be arranged so that the second dimension extends perpendicularly to the prongs of the lifting fork. The scanner detection region extends in the second dimension, for example, over at least 1.5 times or twice or three times the maximum distance of the prongs from one another when the lifting fork is in the lowered state. Even long elongated goods can thereby be reliably detected and measured correctly. The scanner detection region extends in the second dimension, for example, over less than 10 times or 5 times the maximum distance of the prongs from one another when the lifting fork is in the lowered state.

In order to reliably detect even bulky loads, the scanner detection region of the laser scanner can be three-dimensional. The laser scanner can be arranged so that the third dimension extends in the direction of the prongs of the lifting fork. The scanner detection region can, for example, extend in the third dimension at least over the entire prong length when the lifting fork is in the lowered state. The length of the load can thereby be detected and measured over the entire length of the fork. The scanner detection region can, for example, be dimensioned so that the detection of non-homogeneous elongated goods, for example, profiles of different lengths, can be detected by the laser scanner. For the three-dimensional formation of the scanner detection region, the laser scanner can be pivotably arranged on the industrial truck, for example, on the lift mast. It is also conceivable that for the three-dimensional formation of the scanner detection region, a mirror is deflected in two directions or two orthogonally standing rotatable mirrors via which the laser beam is reflected can be arranged close to one another. The laser scanner can, for example, be safety-certified. It can, for example, have a performance level of at least d.

Instead of or in addition to the laser scanner, the elongated-goods detection device may have a camera with a camera detection region. The camera detection region can, for example, be directed at the load-receiving element. The camera detection region can, for example, be dimensioned so that the detection of non-homogeneous elongated goods, for example, profiles of different length, is detected by the camera. The camera can, for example, be safety-certified. It can, for example, have a performance level of at least d. This camera can, for example, be a 3D camera. The camera can, for example, be arranged on the upper region of the lift mast. The camera detection region can further, for example, be directed obliquely downward onto the lifting fork. The camera detection region can, for example, extend in a first dimension at least over the entire prong length when the lifting fork is in the lowered state. The camera detection region can, for example, extend in a second dimension, for example, transversely to the fork prongs, over at least 1.5 times or twice or three times the maximum distance of the prongs from one another when the lifting fork is in the lowered state. Even long elongated goods can thereby be reliably detected and measured correctly. The camera detection region in the second dimension can, for example, extend over less than 10 times or 5 times the maximum distance of the prongs from one another when the lifting fork is in the lowered state.

The lowered state of the lifting fork can, for example, correspond to the state which the lifting fork assumes for receiving the load. The camera and/or the laser scanner can, for example, be arranged so that they do not move along with the load-receiving element during a vertical movement of the load-receiving element.

The safety controller can have two monitoring sensors. The monitoring sensors can be arranged in diagonally opposite sensor positions on the industrial truck and they can each have a monitoring-sensor detection region which extends, for example, in the horizontal direction, over 270°. An industrial truck with such a safety controller can also be designed to be independent, regardless of the aforementioned features.

In a particularly suitable manner, this can provide a round view around the industrial truck and create a condition for the safety controller to form protection fields in any position around the industrial truck.

If the industrial truck has a lift mast that is designed as a reach mast, i.e., can be extended and retracted again, the safety controller can form the at least one protection field or one of the protection fields as a rear-area protection field. An industrial truck with such a safety controller can also be designed to be independent regardless of the aforementioned features.

The rear-area protection field can, for example, be arranged behind the reach mast, i.e., for example, on the side of the reach mast facing away from the load-receiving element or the lifting fork. The rear-area protection field can, for example, cover the rear area at least almost completely.

If the industrial truck has wheel arms, the rear-area protection field can, for example, be arranged between the wheel arms. The safety controller can form the at least one protection field or one of the protection fields as a rear-area protection field, the size of which depends on the respective mast extension position. The safety controller can, for example, form the rear-area protection field as soon as the reach mast is extended.

The rear-area protection field can provide that, when the reach mast is extended, someone entering the area behind the reach mast, for example, the area between the extended reach mast and the wheel arms, will be detected. The rear area can, for example, thereby be safeguarded against trapping persons. A device, for example, a reach mast sensor, may be provided, which detects whether and to what extent the reach mast is extended. The safety controller can, for example, be operatively connected to this device.

The safety controller can, for example, influence the size and shape of the at least one rear-area protection field as a function of the extent to which the reach mast is extended, or, as a function of the extent to which the reach mast is extended, switches between protection fields which differ in size and shape. It can, for example, thereby be achieved that the rear-area protection field always at least almost completely covers the rear area in any possible reach position of the reach mast.

If the industrial truck has a U-shaped chassis in which the two legs of the U-shape are each formed by a wheel arm, the monitoring sensor, with the aid of which the safety controller then forms the rear-area protection field, and which can also be referred to as a rear-area sensor, can, for example, be arranged on the region of the industrial truck connecting the two wheel arms.

In the context of this document, the term "rear area" refers to the area located on the side of the reach mast facing away from the load-receiving element. If the industrial truck has wheel arms, the rear area can, for example, also be limited by the wheel arms. The rear area is then, for example, also limited by the region of the industrial truck connecting the wheel arms to one another.

The industrial truck can have a load-carrier recognition device which is configured to detect and/or measure load carriers so that the industrial truck can clearly measure and/or identify and/or receive the load carriers. An industrial truck with such a load-carrier recognition device can also be designed to be independent regardless of the aforementioned features.

In the context of this document, the term "load carriers" means devices on or in which loads, for example, elongated goods, can be arranged, such as Euro pallets, elongated-goods pallets, workpiece carriers and/or containers, for example, lattice boxes.

The load-carrier recognition device can, for example, comprise a load-carrier recognition camera. The latter can, for example, be a 3D camera. The load-carrier recognition device can, for example, be arranged so that during a vertical movement of the load-receiving element or of the lifting fork, it moves along with the latter and is further, for example, arranged between the prongs of the lifting fork. The industrial truck may have a fork carriage. The fork carriage can, for example, connect the lifting fork to the lift mast. The load-carrier recognition device may be arranged centrally below the fork carriage. The load-carrier recognition device can, for example, have a load-carrier detection region which extends at least also parallel to the prongs of the lifting fork. If the load-carrier detection device is designed as a load-carrier recognition camera, it can, for example, have a viewing direction parallel to the load or to the load-receiving movement which the industrial truck and/or the reach mast carries out during load reception in order to detect and/or measure the load carriers.

Exactly one, two or more or all of the wheels of the industrial truck can be driven. A separate drive motor may be provided for each driven wheel. Exactly one, two or more or all of the wheels of the industrial truck may be steerable. A separate steering motor may be provided for each steerable wheel.

The present invention is explained in greater detail below under reference to the exemplary embodiments shown in the drawings.

The first exemplary embodiment of the industrial truck according to the present invention (hereinafter industrial truck 100) shown in FIGS. 1 to 3 and denoted by 100 relates to an industrial truck 100 with a load-receiving element 1 for receiving elongated goods L.

Figure 5:
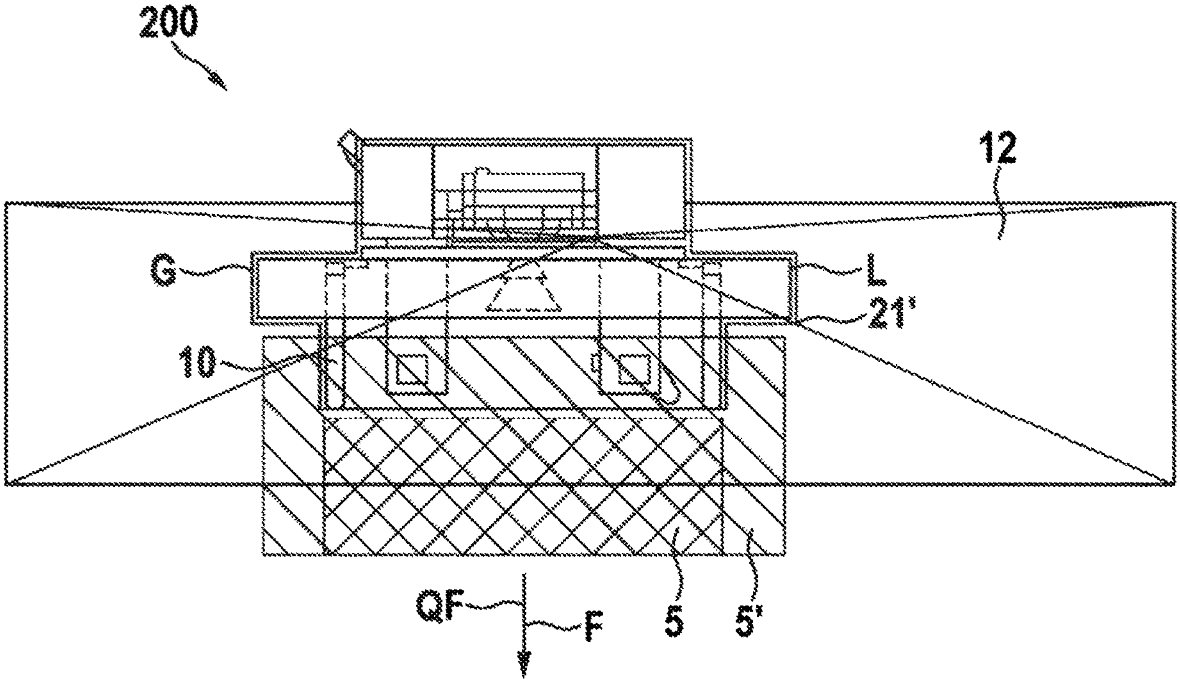
FIG. 5 shows a top view of the industrial truck shown in FIG. 4 with received elongated goods and with a protection field.

The industrial truck 100 is designed as a stacker truck. It thus comprises a lift mast 8, and the load-receiving element 1 of the industrial truck comprise a lifting fork 10. The lifting fork has two prongs 21, 21'. A distance-adjusting device for the prongs 21, 21' is provided, which permits an arrangement of the prongs 21, 21' where they are spaced apart from one another so far that they are arranged outside the wheel arms 20, 20' as viewed from above (see FIG. 3). The industrial truck 100 can be moved in longitudinal travel LF (FIG. 3). It can also be moved in transverse travel QF, as shown in FIG. 5 for the second exemplary embodiment of the industrial truck 200. The industrial truck 100 is designed as a reach truck, with a lift mast 8 which is designed as a reach mast 15 that can be extended and again retracted. The industrial truck 100 has a U-shaped chassis, wherein the two legs of the U shape are each formed by a wheel arm 20, 20'. As can best be seen in FIG. 3, the elongated goods L are a load which projects beyond the outline of the industrial truck 100 in the state received on the load-receiving element 1 and in the ready-to-drive state of the industrial truck 100, i.e., even when the reach mast 15 is retracted, so that an overall outline G results that is larger than the outline of the industrial truck 100 without a load. The industrial truck 100 is a side loader, and thus allows a direction of travel (F) transverse to the fork prongs 21, 21' (FIG. 3).

The industrial truck 100 is a driverless transport vehicle and has an elongated-goods detection device 2 for detecting elongated goods L.

Figure 2:
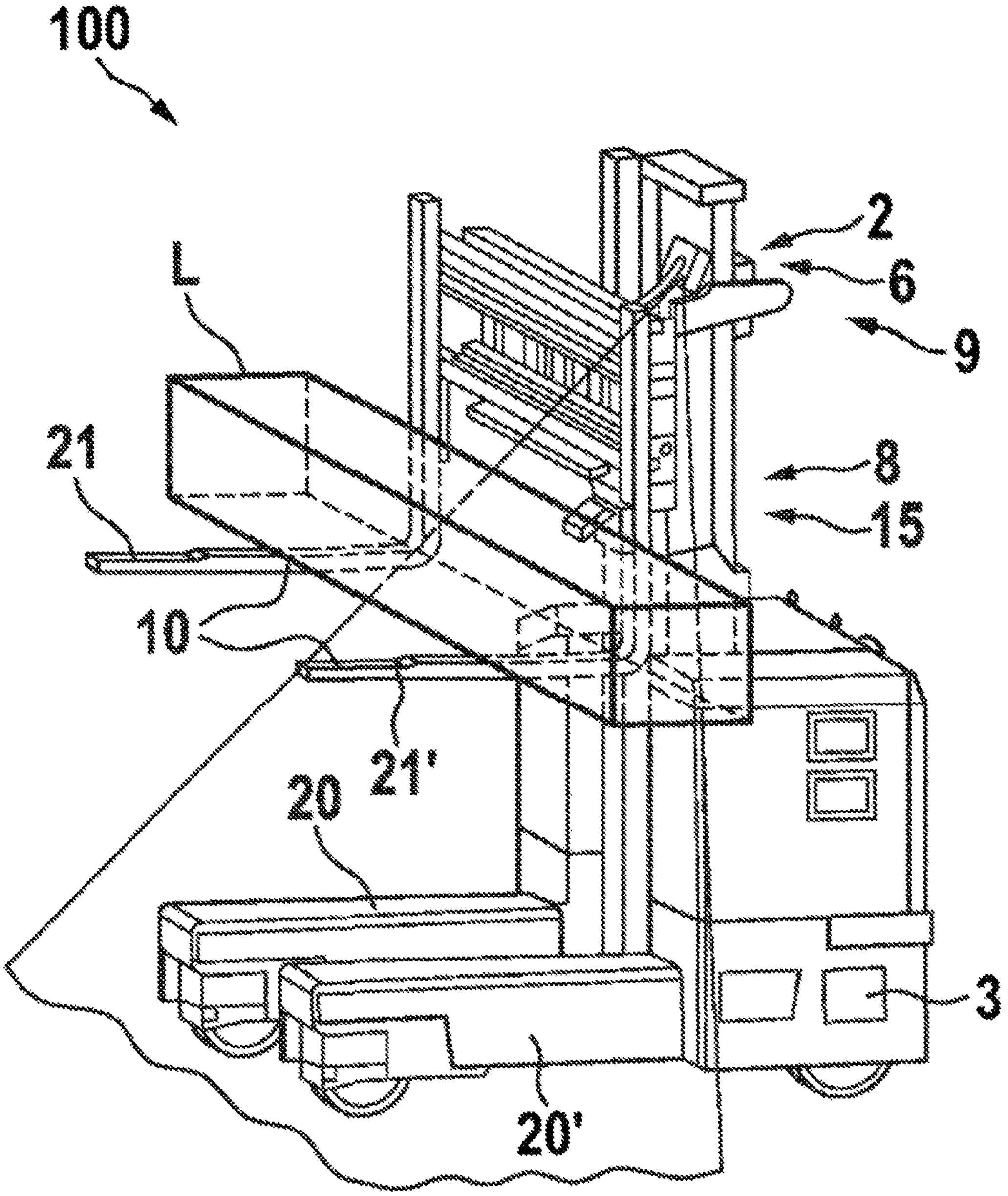
FIG. 2 shows a perspective view of the industrial truck shown in FIG. 1.

The industrial truck 100 also has a safety controller 3 which in FIG. 1 is shown symbolically by a square and which for its part has at least one monitoring sensor 4, 4' and forms at least one protection field 5, 5' therewith. The safety controller 3 is operatively connected to the elongated-goods detection device 2 and is configured to influence the at least one protection field 5, 5' as a function of the elongated goods L detected by the elongated-goods detection device 2.

The safety controller 3 is configured so that the industrial truck 100 will be stopped if vehicles or persons are detected in the protection field 5, 5' via the at least one monitoring sensor 4, 4'.

The safety controller 3 adapts the protection field 5, 5' to the overall outline resulting from the industrial truck 100 and received elongated goods L in that it switches between protection fields 5, 5' as a function of the elongated goods L detected by the elongated-goods detection device 2, the protection fields 5, 5' differing in size and/or shape and/or position relative to the industrial truck 100.

Figure 3:
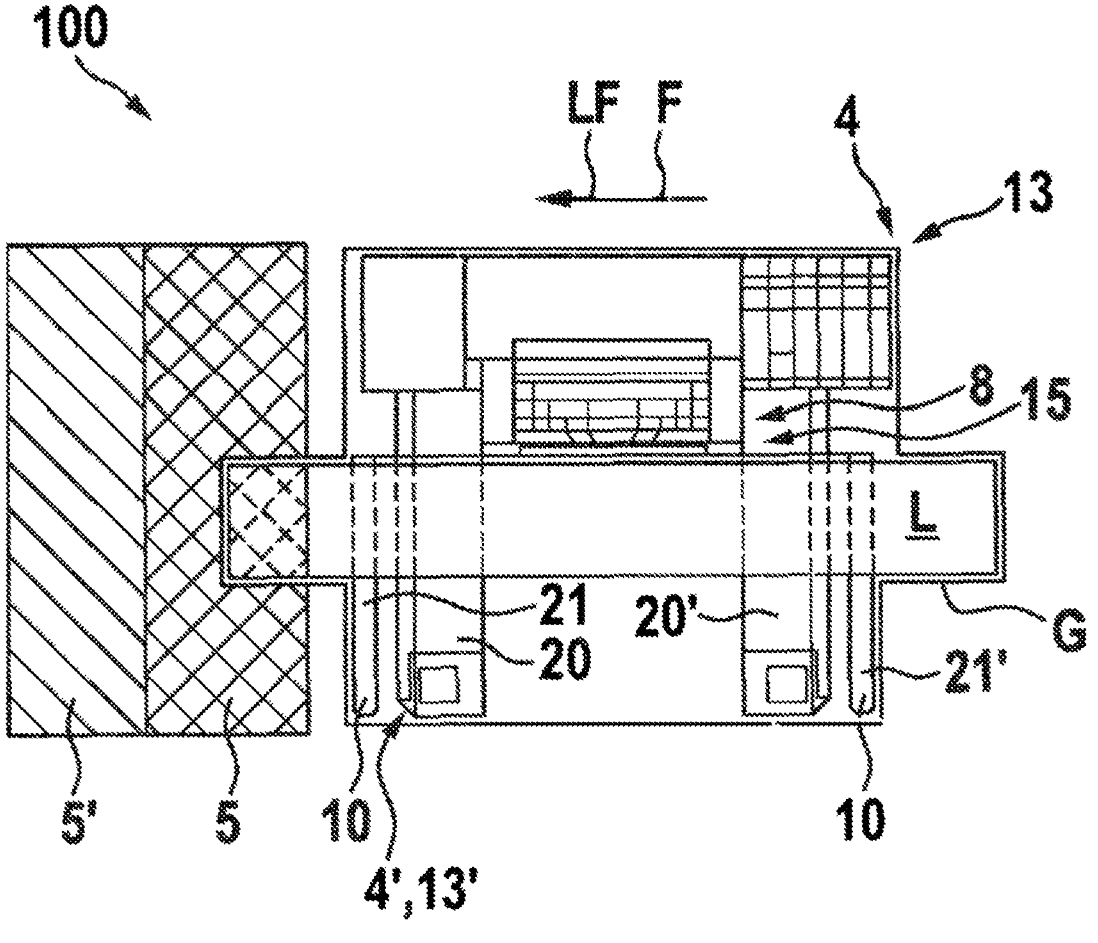
FIG. 3 shows a top view of the industrial truck shown in FIG. 1 with protection fields.

This is shown by way of example in FIG. 3. The industrial truck 100 here is in longitudinal travel LF to the left, at a specific speed. The received load enlarges the overall outline G consisting of industrial truck 100 and load, since the load, for example, projects beyond the outline of the industrial truck 100 in the front in the direction of travel F. In order to take this into account, the safety controller 3 has switched from a protection field 5 (cross-hatched), which it forms during travel in this direction and at this speed without elongated goods L, to a protection field 5' which is larger in the direction of travel. In FIG. 3, the safety controller 3 thus forms a protection field 5' which is larger in the direction of travel F due to the overall outline G enlarged in the front in the direction of travel F.

FIG. 5 shows the situation in transverse travel with received elongated goods L. In order to take account of the widening of the overall outline G, the safety controller 3 has switched from a protection field 5, which it forms in such travel without elongated goods L (cross-hatched), to a wider protection field 5'. In FIG. 5, the safety controller 3 thus forms a protection field 5' which is larger transversely to the direction of travel F due to an overall outline G which is enlarged transversely to the direction of travel F.

In FIGS. 3 and 5, the protection field 5, 5' is formed in front of the industrial truck 100, 200 in the direction of travel F and its width, i.e., the extension transverse to the direction of travel F, is at least approximately the width of the overall outline G. These relationships shown between the vehicle outline/overall outline and protection fields are merely exemplary. The safety controller 3 can thus always provide protection fields which are wider than the vehicle outline or the overall outline G. The safety controller 3 can form other protection fields for cornering.

In the industrial truck 100, the elongated-goods detection device 2 comprises a laser scanner 6, arranged on the upper region 9 of the lift mast 8, with a scanner detection region 7 directed obliquely downward onto the lifting fork 10.

The scanner detection region 7 of the laser scanner 6 itself is initially two-dimensional. The first dimension is here in the direction of the laser beam and the second dimension is perpendicular thereto. The laser scanner 6 is arranged so that the second dimension extends perpendicular to the prongs 21, 21' of the lifting fork 10. The scanner detection region 7 extends in the second dimension over approximately three times the maximum distance of the prongs 21, 21' from one another when the lifting fork 10 is in the lowered state (this state is not shown in the figures). The scanner detection region 7 of the laser scanner 6 (shown in FIG. 1 via dashed lines) is three-dimensional in that the laser scanner 6 is pivotably arranged on the lift mast 8. This is shown in FIG. 1 by a double-headed arrow P. The third dimension of the scanner detection region extends in the direction of the prongs 21, 21' of the lifting fork 10. The scanner detection region 7 extends in the third dimension over the entire prong length when the lifting fork is in the lowered state.

Figure 4:
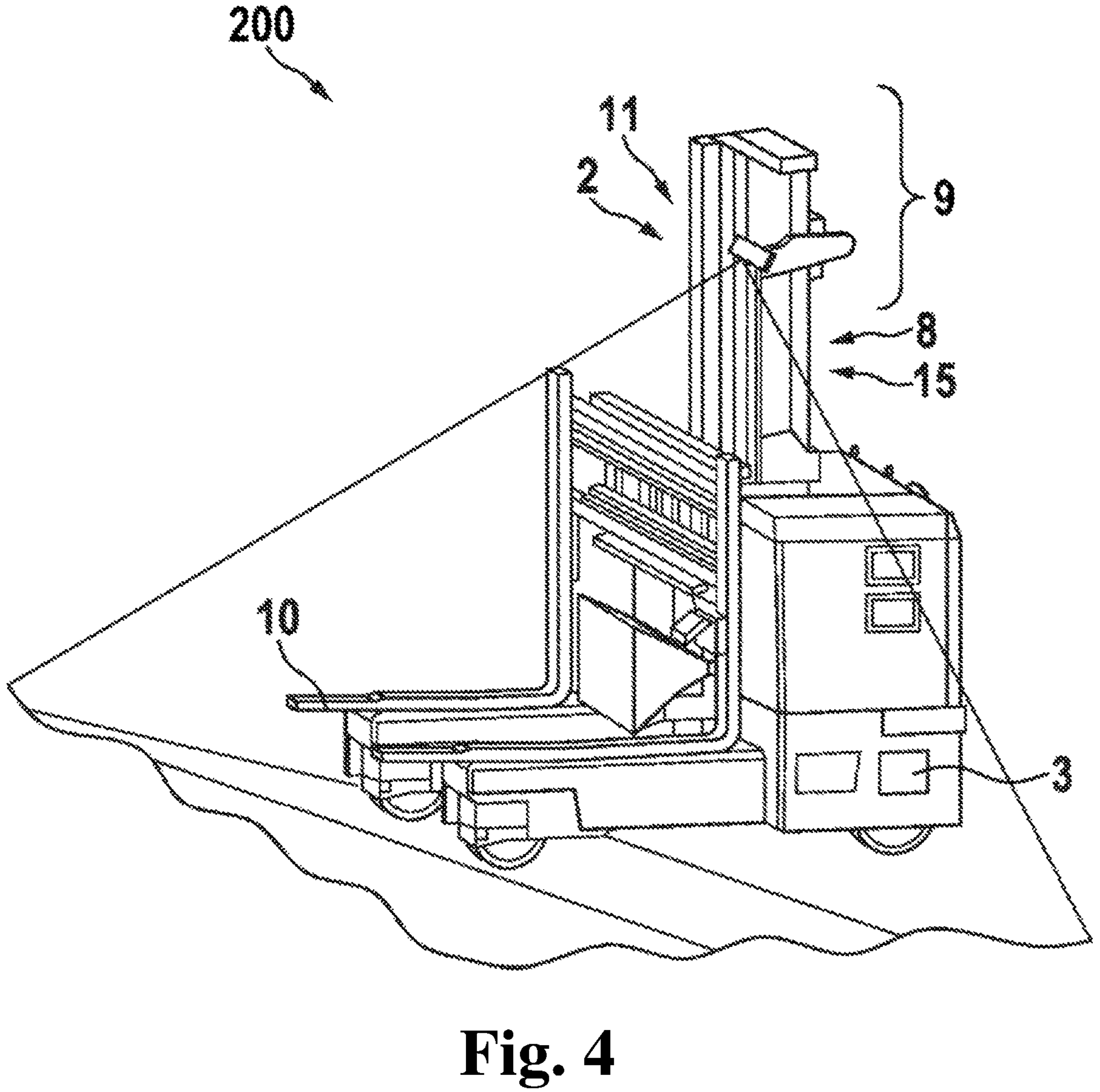
FIG. 4 shows a perspective view of a second exemplary embodiment of the industrial truck according to the present invention with a camera instead of a laser scanner as an elongated-goods detection device.

Further exemplary embodiments are shown in FIGS. 4 to 10. The same reference signs denote the same components. In this respect, reference is made to the description above. Only the differences from the first exemplary embodiment shown in FIGS. 1 to 3 are presented below:

FIGS. 4 and 5 show the second exemplary embodiment, denoted by 200, of the industrial truck 200 according to the present invention. It differs from the first exemplary embodiment of the industrial truck 100 in that the elongated-goods detection device 2 comprises, instead of a laser scanner 6, a camera 11 with a camera detection region 12 (FIG. 5).

Figure 6:
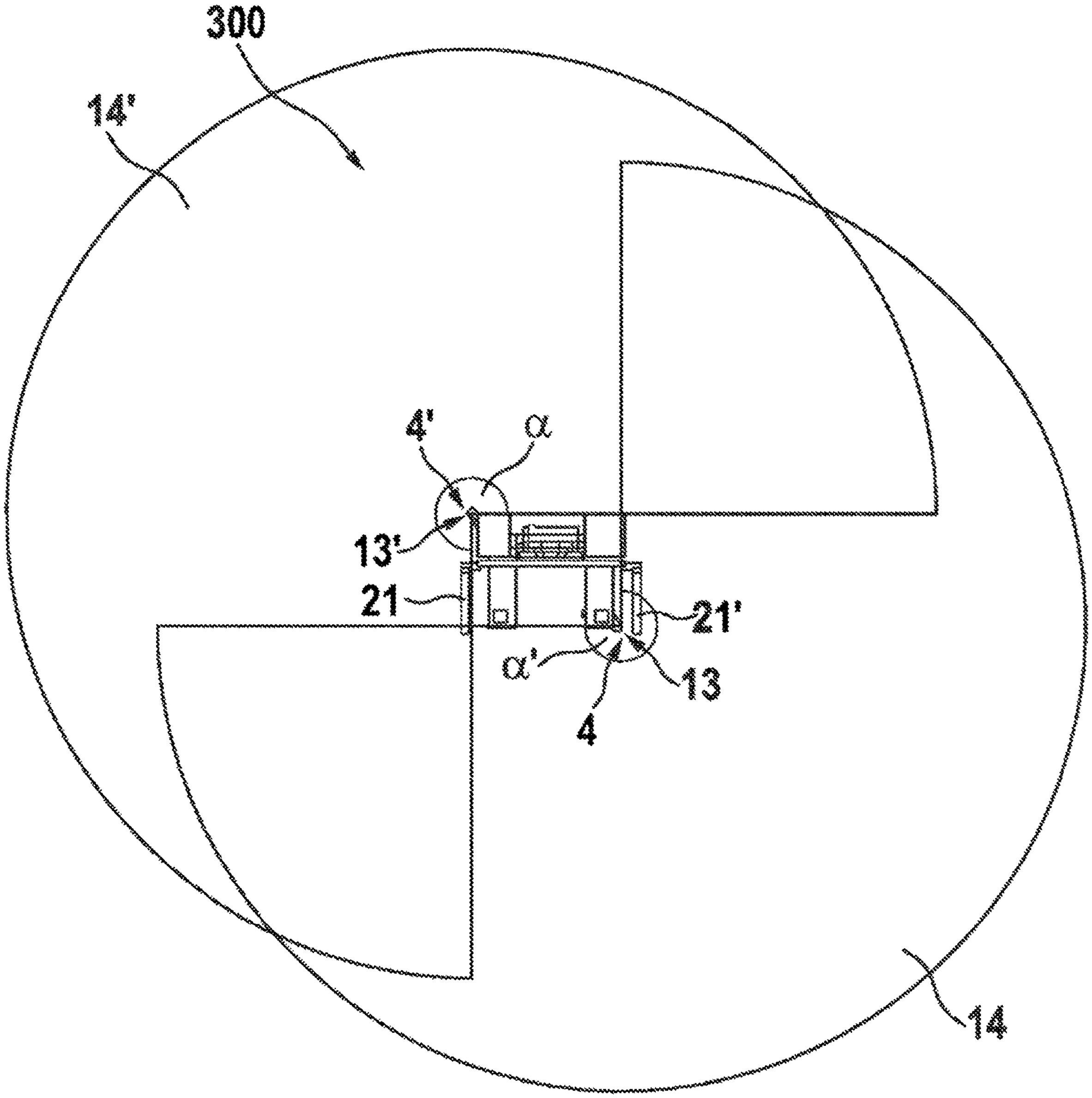
FIG. 6 shows a top view of a third exemplary embodiment of an industrial truck according to the present invention.

In the third exemplary embodiment, shown in FIG. 6 and denoted by 300, of the industrial truck 300 according to the present invention, the safety controller 3 has exactly two monitoring sensors 4, 4' which are arranged on the industrial truck 300 in diagonally opposite sensor positions 13, 13' and which each have a monitoring-sensor detection region 14, 14' which extends, for example, in the horizontal direction, over an angle $\alpha$, $\alpha'$ of 270°. In a particularly suitable manner, this provides a round view around the industrial truck 300.

The at least one monitoring sensor 4, 4' can be designed in this way in all the exemplary embodiments shown in the figures.

Figure 7:
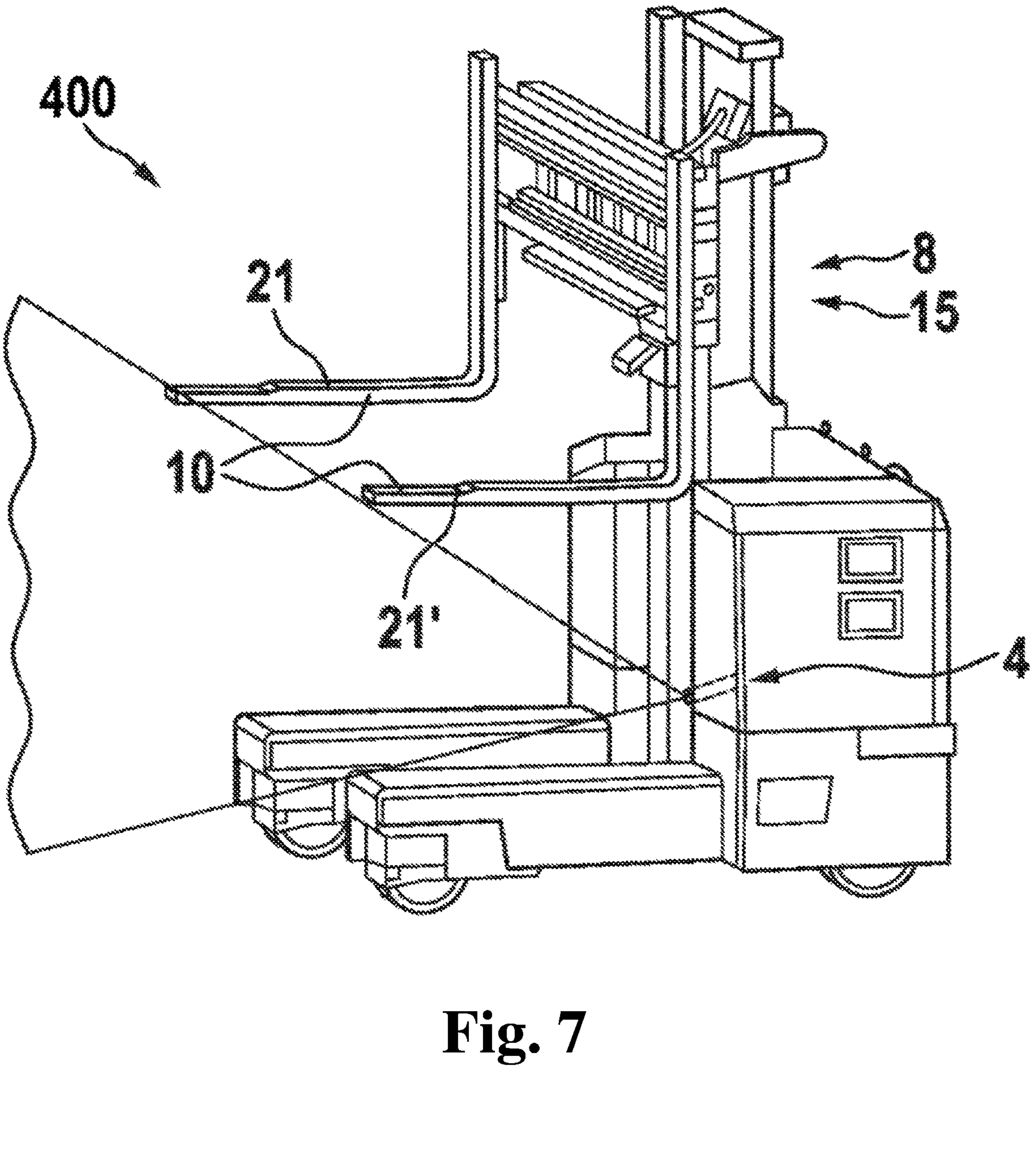
FIG. 7 shows a perspective view of a fourth exemplary embodiment of an industrial truck according to the present invention.
Figure 8:
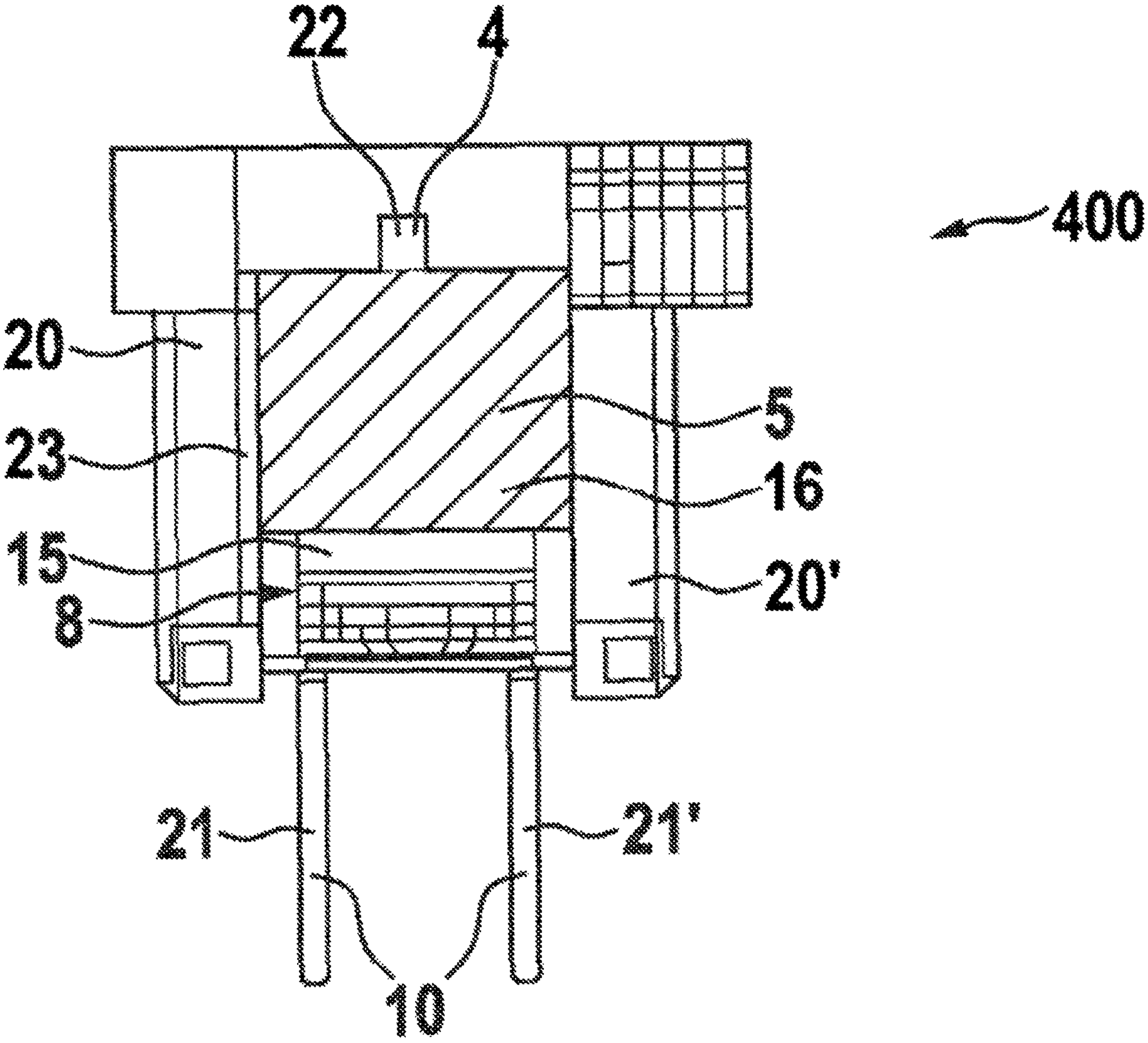
FIG. 8 shows a top view of the industrial truck shown in FIG. 7 with an extended reach mast and a reduced fork distance.

In the fourth exemplary embodiment, shown in FIGS. 7 and 8 and denoted by 400, of the industrial truck 400 according to the present invention, the safety controller 3 forms one of the protection fields 5 as a rear-area protection field 16, the size of which depends on the respective mast extension position and which is shown cross-hatched in FIG. 8. A device, namely a reach mast sensor 23, is provided, which detects whether and to what extent the reach mast 15 is extended. The safety controller 3 is operatively connected to the reach mast sensor 23 and switches, as a function of the extent to which the reach mast 15 is extended, between protection fields which differ in size and shape, so that the rear-area protection field 16 always at least almost completely covers the rear area at any possible reach position of the reach mast 15. The rear-area sensor 22, via which the safety controller 3 forms the rear-area protection field 16, is arranged on the region of the industrial truck 400 connecting the two wheel arms 20, 20'.

Figure 9:
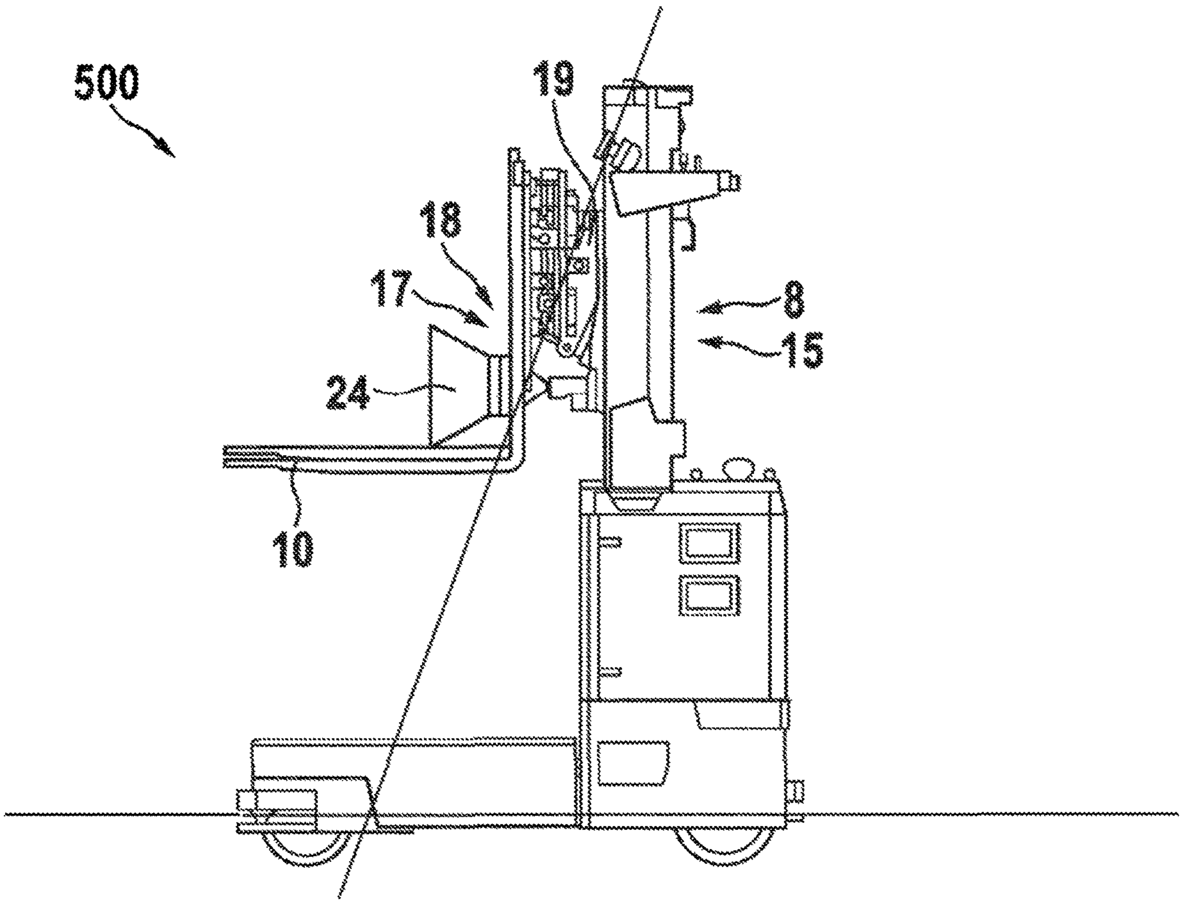
FIG. 9 shows a side view of a fifth exemplary embodiment of the industrial truck according to the present invention.
Figure 10:
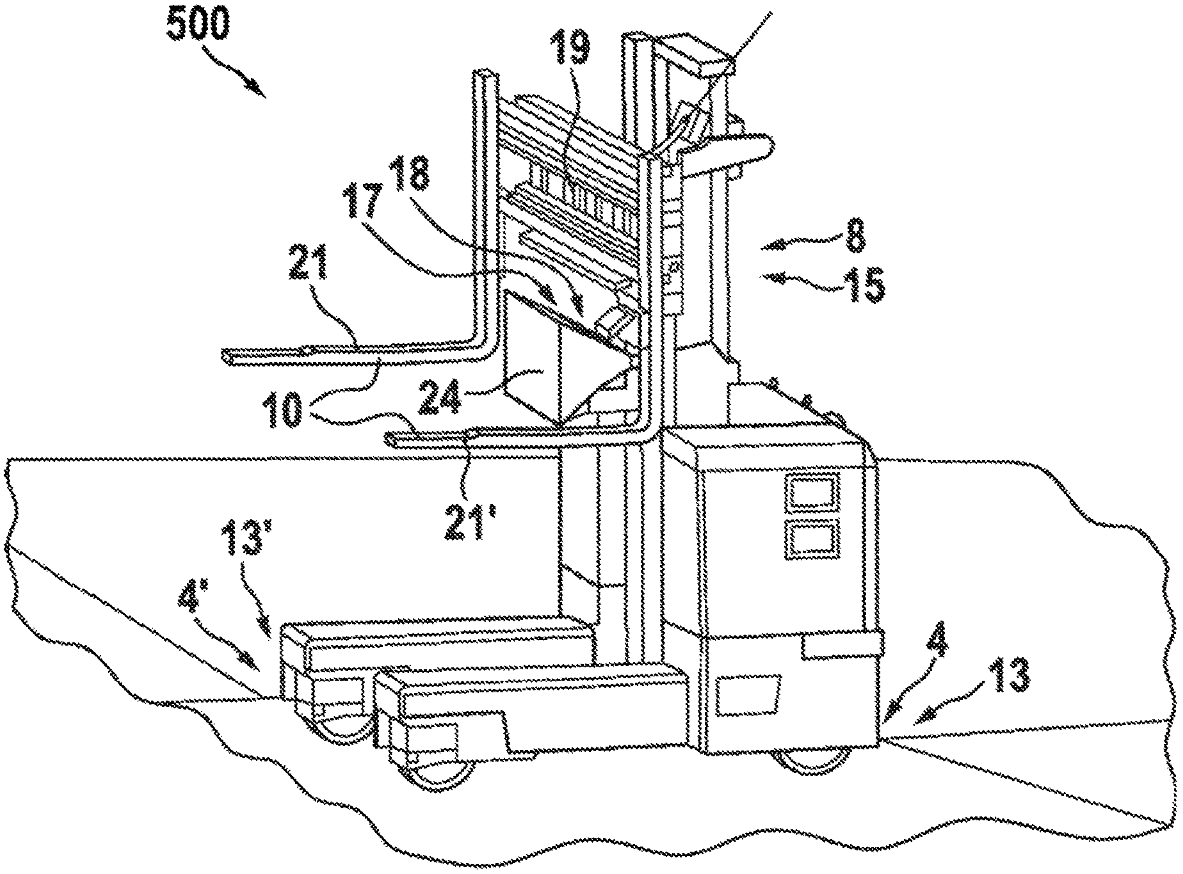
FIG. 10 shows a perspective view of the industrial truck shown in FIG. 9.

In the fifth exemplary embodiment, shown in FIGS. 9 and 10 and denoted by 500, of the industrial truck 500 according to the present invention, the industrial truck 500 comprises a load-carrier recognition device 17 which is configured to detect and measure load carriers, such as Euro pallets or lattice boxes, so that the industrial truck 500 can clearly measure and identify and receive the load carriers. The load-carrier recognition device 17 comprises a load-carrier recognition camera 18 which is designed as a 3D camera and which is arranged between the prongs 21, 21' of the lifting fork 10 centrally below the fork carriage 19. The load-carrier recognition camera 18 has a load-carrier detection region 24 which extends, for example, parallel to the prongs 21, 21 of the lifting fork 10. The load-carrier recognition camera 18 has a viewing direction parallel to the load-receiving movement which the industrial truck 500 and/or the reach mast 15 carries out during load reception in order to detect and measure the load carriers.

The present invention is not limited to embodiments described herein; reference should be had to the appended claims.

LIST OF REFERENCE SIGNS

100, 200, 300, 400, 500 Industrial truck
1 Load-receiving element
2 Elongated-goods detection device
3 Safety controller
4, 4' Monitoring sensor
5, 5' Protection field
6 Laser scanner
7 Scanner detection region
8 Lift mast
9 Upper region
10 Lifting fork
11 Camera
12 Camera detection region
13, 13' Sensor position
14, 14' Monitoring-sensor detection region
15 Reach mast
16 Rear-area protection field
17 Load-carrier recognition device
18 Load-carrier recognition camera
19 Fork carriage
20, 20' Wheel arm
21, 21' Prongs
22 Rear-area sensor
23 Reach mast sensor
24 Load-carrier detection region
$\alpha$, $\alpha'$ Angle
F Direction of travel
G Overall outline
L Elongated goods
P Double-headed arrow
LF Longitudinal travel
QF Transverse travel

What is claimed is:

1. An industrial truck comprising:

a load-receiving element which is configured to receive elongated-goods;

an elongated-goods detection device which is configured to detect the elongated-goods received on the load-receiving element; and a safety controller comprising at least one monitoring sensor, the safety controller forming at least one protection field together with the at least one monitoring sensor, wherein, the safety controller is operatively connected to the elongated-goods detection device and is configured to influence the at least one protection field as a function of the elongated-goods detected by the elongated-goods detection device.

2. The industrial truck as recited in claim 1, wherein the industrial truck is a driverless transport vehicle which is designed as a side loader.

3. The industrial truck as recited in claim 1, wherein the safety controller is further configured to adapt the at least one protection field to an overall outline resulting from the industrial truck and the elongated goods received.

4. The industrial truck as recited in claim 1, wherein, the at least one protection field includes protection fields which differ in at least one of a size, a shape and a position relative to the industrial truck, and the safety controller is further configured to switch between the protection fields as a function of the elongated goods detected by the elongated-goods detection device.

5. The industrial truck as recited in claim 1, further comprising:

a lift mast which comprises an upper region and a lifting fork, wherein, the elongated-goods detection device comprises a laser scanner which comprises a scanner detection region, the laser scanner being arranged on the upper region of the lift mast so that the scanner detection region is directed obliquely downward onto the lifting fork.

6. The industrial truck as recited in claim 1, further comprising:

a lift mast which comprises an upper region and a lifting fork, wherein, the elongated-goods detection device comprises a camera which comprises a camera detection region, the camera being arranged on the upper region of the lift mast so that the camera detection region is directed obliquely downward onto the lifting fork.

7. The industrial truck as recited in claim 1, wherein, the safety controller comprises two of the at least one monitoring sensor, the two monitoring sensors being arranged on the industrial truck in diagonally opposite sensor positions, and each of the two monitoring sensors comprises a monitoring-sensor detection region which extends over 270°.

8. The industrial truck as recited in claim 1, further comprising:

a lift mast which is designed as a reach mast; and wheel arms, wherein, the safety controller forms the at least one protection field as a rear-area protection field which is arranged on a side of the reach mast facing away from the load-receiving element and between the wheel arms.

9. The industrial truck as recited in claim 8, wherein the reach mast is configured to be repeatedly extendable and retractable.

10. The industrial truck as recited in claim 1, further comprising:

a load-carrier recognition device which is configured to at least one of detect and measure a load-carrier so that the industrial truck can at least one of measure, identify and receive the load-carrier.

11. The industrial truck as recited in claim 10, further comprising:

a lifting fork comprising prongs, wherein, the load-carrier recognition device comprises a load-carrier recognition camera which is arranged between the prongs of the lifting fork.

* * * * *